US010661905B2

(12) United States Patent
Schumm

(10) Patent No.: US 10,661,905 B2
(45) Date of Patent: May 26, 2020

(54) AIRPLANE SEAT DEVICE

(71) Applicant: RECARO Aircraft Seating GmbH & Co. KG, Schwaebisch Hall (DE)

(72) Inventor: Andreas Schumm, Forchtenberg (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 63 days.

(21) Appl. No.: 15/756,216

(22) PCT Filed: Aug. 29, 2016

(86) PCT No.: PCT/EP2016/070312
§ 371 (c)(1),
(2) Date: Jun. 14, 2018

(87) PCT Pub. No.: WO2017/037016
PCT Pub. Date: Mar. 9, 2017

(65) Prior Publication Data
US 2018/0290754 A1 Oct. 11, 2018

(30) Foreign Application Priority Data

Sep. 2, 2015 (DE) .................. 10 2015 114 677

(51) Int. Cl.
*B64D 11/06* (2006.01)
*B60N 2/005* (2006.01)
*B60N 2/70* (2006.01)

(52) U.S. Cl.
CPC ........ *B64D 11/0649* (2014.12); *B60N 2/7005* (2013.01); *B64D 11/06* (2013.01); *B64D 11/0647* (2014.12); *Y02T 50/46* (2013.01)

(58) Field of Classification Search
CPC ............ B64D 11/0649; B64D 11/0647; B60N 2/7005
(Continued)

(56) References Cited

U.S. PATENT DOCUMENTS 2,722,267 A 12/1952 Liljengren
3,758,159 A * 9/1973 Morris .................... B60N 2/38
297/452.55 X
(Continued)

FOREIGN PATENT DOCUMENTS

AT 509326 A4 8/2011
DE 202006006571 U1 9/2006
(Continued)

OTHER PUBLICATIONS

International Preliminary Report ("IPR") dated Mar. 15, 2018 issued in corresponding International patent application No. PCT/EP2016/070312.
(Continued)

*Primary Examiner* — Rodney B White
(74) *Attorney, Agent, or Firm* — Posz Law Group, PLC

(57) ABSTRACT

An airplane seat device has a seat base module, comprising at least one main body which is at least substantially implemented from a rigid foam, at least one comfort element disposed on an upper side of the main body, at least one accommodating region for attaching to a tubular support, and at least one fastening element for attaching to the tubular support, wherein the main body has at least two coupling regions, via which the at least one fastening element can be selectively attached to the main body.

16 Claims, 2 Drawing Sheets

(58) Field of Classification Search
USPC .................................... 297/440.22, 452.55
See application file for complete search history.

(56) References Cited

U.S. PATENT DOCUMENTS

| | | | | |
|---|---|---|---|---|
| 3,785,600 | A * | 1/1974 | Padovano | B64D 11/06 248/188.1 |
| 4,375,300 | A * | 3/1983 | Long | B60N 2/242 244/122 R |
| 5,092,655 | A * | 3/1992 | Deegener | B64D 11/06 297/452.25 |
| 5,485,976 | A | 1/1996 | Creed et al. | |
| 5,553,923 | A * | 9/1996 | Bilezikjian | B64D 11/06 297/452.2 X |
| 5,947,562 | A * | 9/1999 | Christofferson | A61G 5/10 297/440.22 X |
| 6,241,188 | B1 * | 6/2001 | Simpson | B60N 2/6027 244/122 R |
| 6,273,510 | B1 * | 8/2001 | Ehemann | B60N 2/68 297/440.22 X |
| 6,279,998 | B1 * | 8/2001 | Chu | A47C 1/023 297/440.22 X |
| 7,806,476 | B2 | 10/2010 | Forgatsch | B60N 2/62 297/452.55 X |
| 8,782,835 | B2 * | 7/2014 | Pozzi | B64D 11/0647 297/440.22 X |
| 9,764,844 | B2 * | 9/2017 | Le | B64D 11/0639 |
| 2009/0108132 | A1 | 4/2009 | Guttropf | |
| 2012/0139302 | A1 | 6/2012 | Estevenin et al. | |
| 2013/0247303 | A1 | 9/2013 | Pozzi | |
| 2016/0023765 | A1 * | 1/2016 | Zheng | B64D 11/0619 297/342 |
| 2016/0023769 | A1 * | 1/2016 | Zheng | B64D 11/0648 297/452.18 |
| 2016/0297533 | A1 * | 10/2016 | Le | B64D 11/0639 |
| 2016/0297536 | A1 * | 10/2016 | Velasco | B64D 11/0647 |
| 2018/0079509 | A1 * | 3/2018 | Le | |
| 2018/0281970 | A1 * | 10/2018 | Hodgkinson | F16B 1/00 |

FOREIGN PATENT DOCUMENTS

| | | |
|---|---|---|
| DE | 102009006717 A1 | 8/2010 |
| DE | 102009013687 A1 | 9/2010 |
| DE | 102009037748 A1 | 4/2011 |
| EP | 1000856 A2 | 5/2000 |
| EP | 1214900 A1 | 6/2002 |
| GB | 2502508 A | 12/2013 |

OTHER PUBLICATIONS

International Search Report dated Nov. 11, 2016 issued in corresponding International patent application No. PCT/EP2016/070312.
Search Report dated May 31, 2016 issued in corresponding DE patent application No. 10 2015 114 677.0 (and partial English translation thereof).
Office Action dated Nov. 18, 2019 issued in corresponding EP patent application No. 16 760 033.7.

* cited by examiner

AIRPLANE SEAT DEVICE

CROSS REFERENCE TO RELATED APPLICATIONS

This application is a U.S. national stage application of PCT/EP2016/070312 filed on Aug. 29, 2016, which is based on German Patent Application No. 10 2015 114 677.0 filed on Sep. 2, 2015, the contents of which are incorporated herein by reference.

PRIOR ART

The invention relates to an airplane seat device according to the preamble of patent claim 1.

Airplane seat devices having a seat base module which has at least one main body which at least substantially is implemented from a rigid foam, at least one comfort element that is disposed on an upper side of the main body, at least one accommodating region for attaching to a tubular support, and at least one fastening element for attaching to the tubular support, have already been proposed.

The object of the invention lies in particular in providing a device of the generic type having improved properties in terms of cost and service friendliness. The object is achieved according to the invention by the features of patent claim 1, while advantageous design embodiments and refinements of the invention can be derived from the dependent claims.

ADVANTAGES OF THE INVENTION

The invention proceeds from an airplane seat device with a seat base module comprising at least one main body, which is at least substantially implemented from a rigid foam, at least one comfort element disposed on an upper side of the main body, at least one accommodating region for attaching to a tubular support, and at least one fastening element for attaching to the tubular support.

It is proposed that the main body has at least two coupling regions, via which the at least one fastening element can be selectively attached to the main body. A "seat base module" herein is to be understood in particular as a module of an airplane seat which configures the seat region for a passenger, wherein the seat base module herein is preferably formed by a main body and by a comfort element that is attached to the main body. A "seat region" herein is to be understood in particular as a region of the airplane seat which is configured for a passenger to be seated thereon, in particular during a flight. An "airplane seat" herein is to be understood in particular as a seat which is configured to be erected in an airplane cabin of an airplane. The airplane seat herein preferably has a mounting unit by means of which the airplane seat can be fixedly erected on a cabin floor of the airplane cabin. A "main body" herein should be understood in particular as a supporting structure, in particular of the seat base module. "At least substantially implemented from a rigid foam" herein is to be understood to be formed in particular to the extent of at least more than 50%, preferably more than 80%, and in one particularly advantageous design embodiment, more than 90%, from a rigid foam. The main body is preferably formed completely from a rigid foam. An "upper side of the main body" herein is to be understood in particular as a side of the main body which in a mounted state is directed away from a support frame plane on which the airplane seat is erected. A "comfort element" herein is to be understood in particular as an element which forms the seat region for the passenger and herein configures in particular a replaceable and/or cushioned sub-base. The comfort element herein preferably has a cover which surrounds the seat region, wherein the cover herein can be formed, for example, from a textile, leather, or another material that is considered expedient to a person skilled in the art. The comfort element preferably has a cushion which can be formed from a soft foam, for example, wherein the cushion herein is preferably surrounded by the cover. In principle, it is also conceivable that the cover is embodied integrally with the cushion, or else that the comfort element does not have any cushion or any cover. A "accommodating region" herein is to be understood in particular as a region which is configured for elements to which the seat base module is coupled to be at least partially disposed therein. A "tubular support" herein is to be understood in particular as a transverse support of an airplane seat which runs transversely to a seating direction of the airplane seat and forms part of a supporting structure of the airplane seat, wherein the tubular support herein preferably configures the supporting structure of a plurality of airplane seats which form one seat row. A "coupling region" herein is to be understood in particular as a region, via which the fastening element can be fixedly coupled to the main body. A coupling region herein preferably has in each case at least one region in which a fastening element is connectable in a form-fitting, force-fitting and/or materially integral manner to the main body. It is conceivable herein that the fastening elements in a coupling region are coupled to the main body by way of an adhesive connection, or by way of a form-fitting element. In principle, it is likewise conceivable that the fastening elements are incorporated in a coupling region in the main body, thus are injection molded into the main body, for example, or are integrated into the main body by a foaming method. The coupling region preferably has two through bores which are disposed so as to be mutually spaced apart and which are incorporated into the main body and in each case reach from an underside of the main body up to the upper side of the main body and through which the fastening element that is embodied as a tape can be guided so as to establish a form-fitting connection to the main body. The main body per attachment region preferably has at least two, preferably four, coupling regions. On account thereof, the seat base module can be implemented in a particularly simple and advantageous manner, thus providing in particular an airplane seat device which is particularly cost-effective and simple to service. In particular, the main body can be coupled to the tubular supports in an advantageously secure and variable manner on account thereof.

It is furthermore proposed that the coupling regions are disposed in the accommodating regions. "Disposed in the accommodating regions" herein is to mean in particular that an element or a region, in particular a coupling region, is implemented to be at least partially congruent with the accommodating region. At least part of, preferably an entire coupling region herein is located in the accommodating region. On account thereof, the coupling regions can be disposed in a particularly advantageous manner in order for fastening elements to be attached.

It is furthermore proposed that the seat base module has at least one spacer, which in a mounted state is disposed in the at least one accommodating region and is configured for spacing apart the main body and the tubular support. A "spacer" herein is to be understood in particular as an element which is configured for disposal between two elements such as, in particular, the main body and the tubular support, so as to establish a spacing between said two elements. The two elements which are mutually separated by way of the spacer do not contact one another herein. A transmission of force, in particular a transmission of a compressive force, between the two elements such as, in particular the main body and the tubular support, takes place by way of the at least one spacer.

"Configured" is to be understood as being specially designed and/or equipped. That an object is configured for a specific function is to mean in particular that the object fulfils and/or carries out this specific function in at least one application state and/or operation state. On account thereof, an attachment to the tubular support may be preferably realized such that other attachment elements, for example for seat feet, in the mounted state do not collide with the main body of the seat base module. On account thereof, the main body may be implemented in an advantageously simple manner since no recesses for respective attachment elements have to be provided in the main body.

It is moreover proposed that the seat base module in the at least one accommodating region has at least one form-fitting and/or force-fitting element, via which the spacer is captively fastenable in the accommodating region. A "form-fitting and/or force-fitting element" herein is to be understood in particular as an element via which an element such as, in particular, a spacer can be connected in a form-fitting and/or force-fitting manner to the main body. The form-fitting and/or force-fitting element herein is preferably embodied as a recess which is implemented so as to be smaller than a corresponding form-fitting and/or force-fitting element of the spacer that is embodied as a pin. During an assembly procedure in which the spacer by way of the form-fitting and/or force-fitting element thereof that is embodied as a pin is connected to the form-fitting and/or force-fitting element of the accommodating region that is embodied as a recess, the form-fitting and/or force-fitting element that is embodied as a pin cuts into the main body which configures the form-fitting and/or force-fitting element of the accommodating region that is embodied as a recess, on account of which a form-fit and/or a force-fit is created. On account thereof, the at least one spacer can be connected to the main body in an advantageously simple manner.

It is furthermore proposed that the seat base module in the at least one accommodating region has further form-fitting and/or force-fitting elements which are disposed so as to be mutually spaced apart and by which the at least one spacer is captively fastenable in the accommodating region. A "further form-fitting and/or force-fitting element" herein is to be understood in particular as at least one, preferably a plurality of, form-fitting and/or force-fitting elements which are disposed so as to be mutually spaced apart and distributed in the accommodating region, said form-fitting and/or force-fitting elements in particular being implemented identically such that at least two spacers can be simultaneously disposed in a force-fitting and/or form-fitting manner in the accommodating region. More than four form-fitting and/or force-fitting elements are preferably disposed in the accommodating region such that the spacers can be disposed in at least four different positions in the accommodating region. On account thereof, the accommodating region can be implemented in an in particular advantageously flexible manner, and the spacers, depending on the design embodiment of the respective airplane seat, can be disposed differently in the accommodating region, depending on an arrangement of seat feet.

It is furthermore proposed that the at least one fastening element is embodied as a tape by which the main body is connectable to the tubular support. A "fastening element which is embodied as a tape" herein is to be understood in particular as a fastening element which has the shape of a tape and has a width of more than 5 mm. The fastening element which is embodied as a tape herein is preferably embodied as a hook-and-pile tape that is formed from a textile. In principle, it would also be conceivable that the fastening element which is embodied as a tape is implemented, for example, as a textile tape which at a first end has a form-fitting element that is implemented as a hook, and at a second end has a plurality of form-fitting elements which are implemented as recesses and are disposed to be mutually spaced apart and by which the two ends are connectable to one another at various lengths. In principle, it would also be conceivable that the fastening element which is embodied as a tape is implemented as a wide cable tie or as a similar fastening element which appears expedient to a person skilled in the art. On account thereof, the seat base module is connectable to a supporting structure, in particular to the at least one tubular support of the airplane seat, in a particularly simple and cost-effective manner.

It is furthermore proposed that the at least one fastening element is implemented as a hook-and-pile tape. On account thereof, the fastening element can be implemented in a particularly advantageous manner.

It is moreover proposed that the at least one fastening element has at least one attachment region via which the comfort element is fixedly connectable to the fastening element. An "attachment region" herein is to be understood in particular as a region which has at least one means for establishing a form-fitting and/or force-fitting connection. At least one pile and/or hook tape herein is preferably disposed in the attachment region. In principle, it is also conceivable that at least one other form-fitting and/or force-fitting element that appears expedient to a person skilled in the art, such as for example a press stud or a snap-fit element, is disposed in the attachment region. It is conceivable herein that the main body has additional attachment regions which are likewise configured for attaching the comfort element. On account thereof, the comfort element is connectable to the main body in a particularly simple manner, wherein the fastening element that is used for coupling the main body to the tubular support can in particular be additionally utilized for attaching the comfort element.

It is furthermore proposed that the attachment region of the at least one fastening element is implemented as a pile or hook region. On account thereof, the attachment region can be implemented in a particularly advantageous manner.

It is moreover proposed that the seat base module has at least one reinforcement element that is disposed on an underside of the main body. An "underside of the main body" herein is to be understood in particular as a side of the main body which in a mounted state faces the support frame plane on which the airplane seat is erected. A "reinforcement element" herein is to be understood in particular as an element which increases a strength and/or a rigidity of the main body, wherein the reinforcement element herein can be implemented integrally with the main body, or can be implemented as a separate element that is connected to the main body by a method that appears expedient to a person skilled in the art. The reinforcement element is preferably embodied as a separate element which is fixedly disposed on the underside of the main body. In principle, it is also conceivable that the reinforcement element is embodied as a rib or a material thickening that is integral to the main body. In principle, it is also conceivable that the reinforcement element is implemented as an insert. In principle, it is also conceivable that the reinforcement element is formed from the same material as the main body and merely by way of a corresponding production method has a higher density. On account thereof, the main body in regions in which the reinforcement elements are disposed can be implemented in an in particular advantageously thin manner so as to in particular make space for add-on parts.

It is furthermore proposed that the at least one accommodating region is implemented by the main body for an attachment to one of the tubular supports and is disposed so as to be spaced apart from the at least one reinforcement element. "Disposed so as to be spaced apart" herein is to mean in particular that the accommodating region and the at least one reinforcement element are disposed in non-damaging regions of the main body and that said regions in particular do not intersect. On account thereof, the seat base module can be implemented in a particularly advantageous manner.

It is furthermore proposed that the reinforcement element is formed by a substantially thin plastics layer. "Formed at least substantially by a thin plastics layer" herein is to be understood in particular that the reinforcement element in terms of the area thereof, is formed to the extent of at least 50%, preferably to more than 75%, and in one particularly advantageous design embodiment to more than 90%, by a thin plastics layer. A "thin plastics layer" herein is to be understood as a layer from a plastic which has a thickness of less than 5 mm, preferably of 1.5 mm. The main body herein by a production method is preferably foamed onto the finished reinforcement elements and herein is connected in a form-fitting, force-fitting and/or materially integral manner to the reinforcement elements. In principle, it is also conceivable that the reinforcement elements are fixedly connected to the underside of the main body in a method step after the foaming of the main body, by means of a method that appears expedient to a person skilled in the art, for example by means of an adhesive method. On account thereof, the reinforcement element can be implemented in a particularly advantageous and space-saving manner, on account of which a saving in materials and, on account thereof, in space on the main body is particularly advantageous, and thus an in particular advantageously large space for add-on parts, such as an HIC couple, for example, can be established.

The airplane seat device according to the invention herein is not intended to be limited to the application and embodiment described above. In particular, the airplane seat device according to the invention for fulfilling a functional mode described herein can have a number of individual elements, components, and units that deviates from the number mentioned herein.

DRAWINGS

Further advantages are derived from the following description of the drawings. An exemplary embodiment of the invention is illustrated in the drawings. The drawings, the description, and the claims include numerous features in combination. A person skilled in the art will expediently also consider the features individually and combine the latter so as to form further expedient combinations.

DESCRIPTION OF THE EXEMPLARY EMBODIMENT

Figure 1:
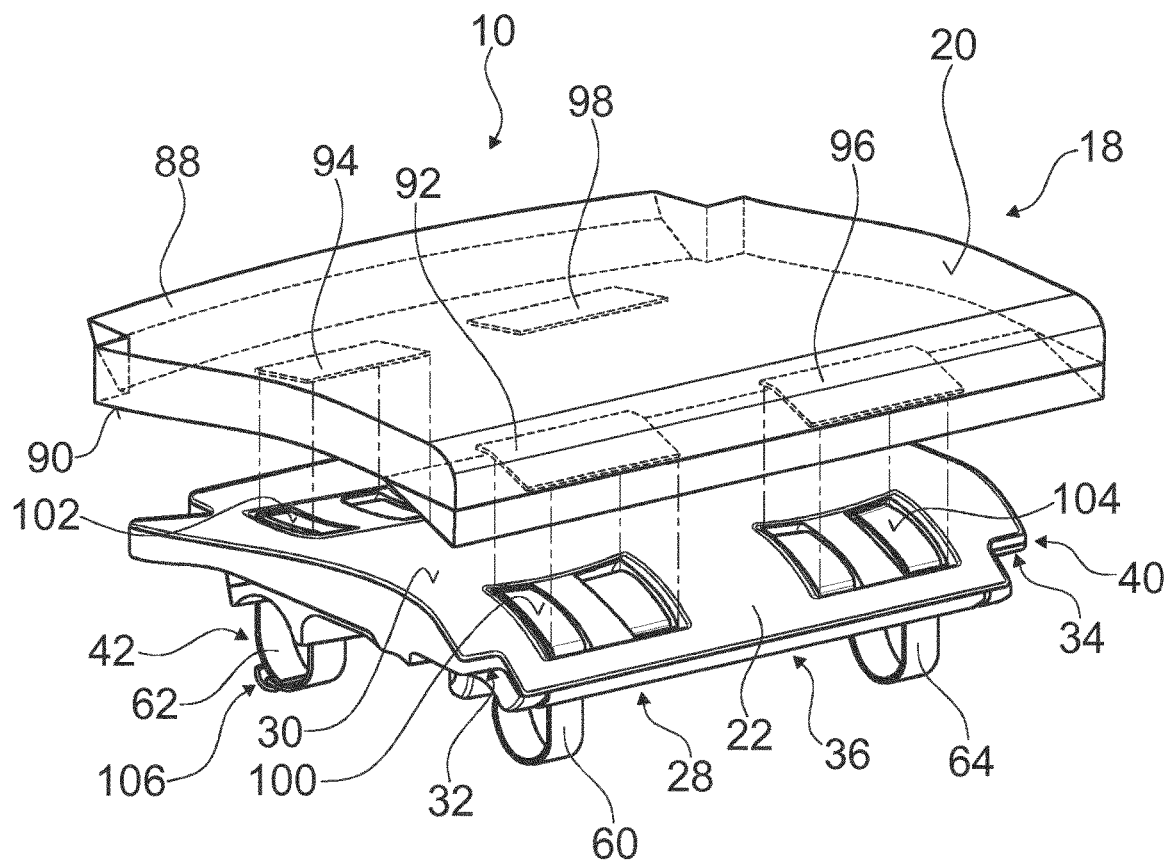
FIG. 1 shows a schematic illustration of an airplane seat device according to the invention, having the seat base module having a comfort element that is disposed so as to be spaced apart.
Figure 2:
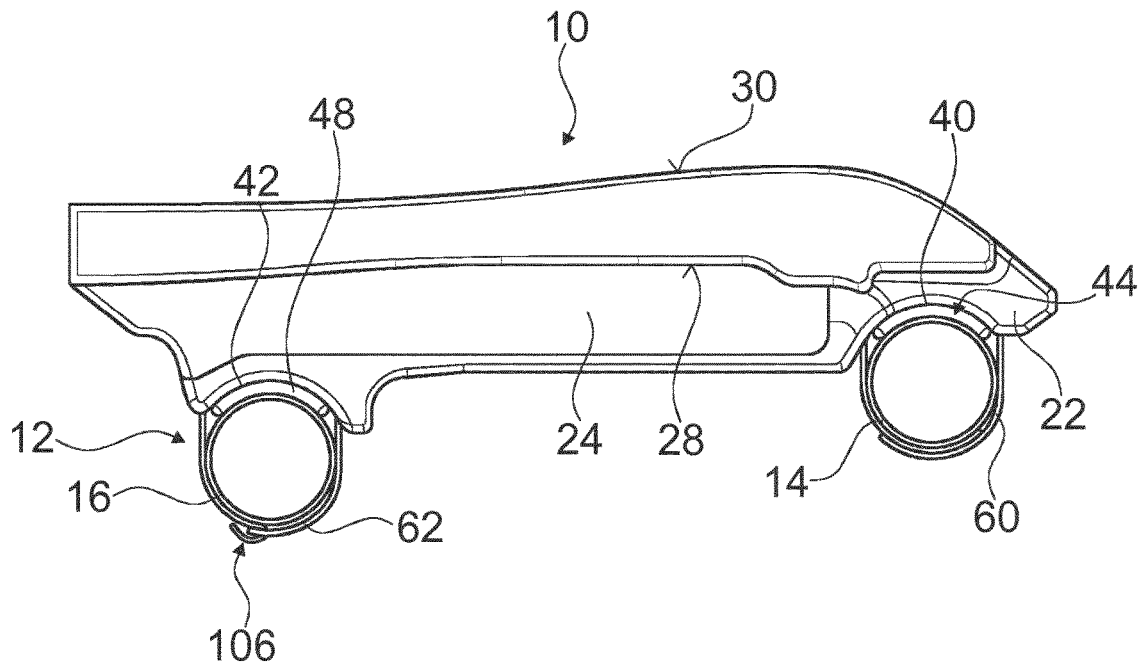
FIG. 2 shows a lateral view of the seat base module in a state attached to tubular supports of an airplane seat.
Figure 3:
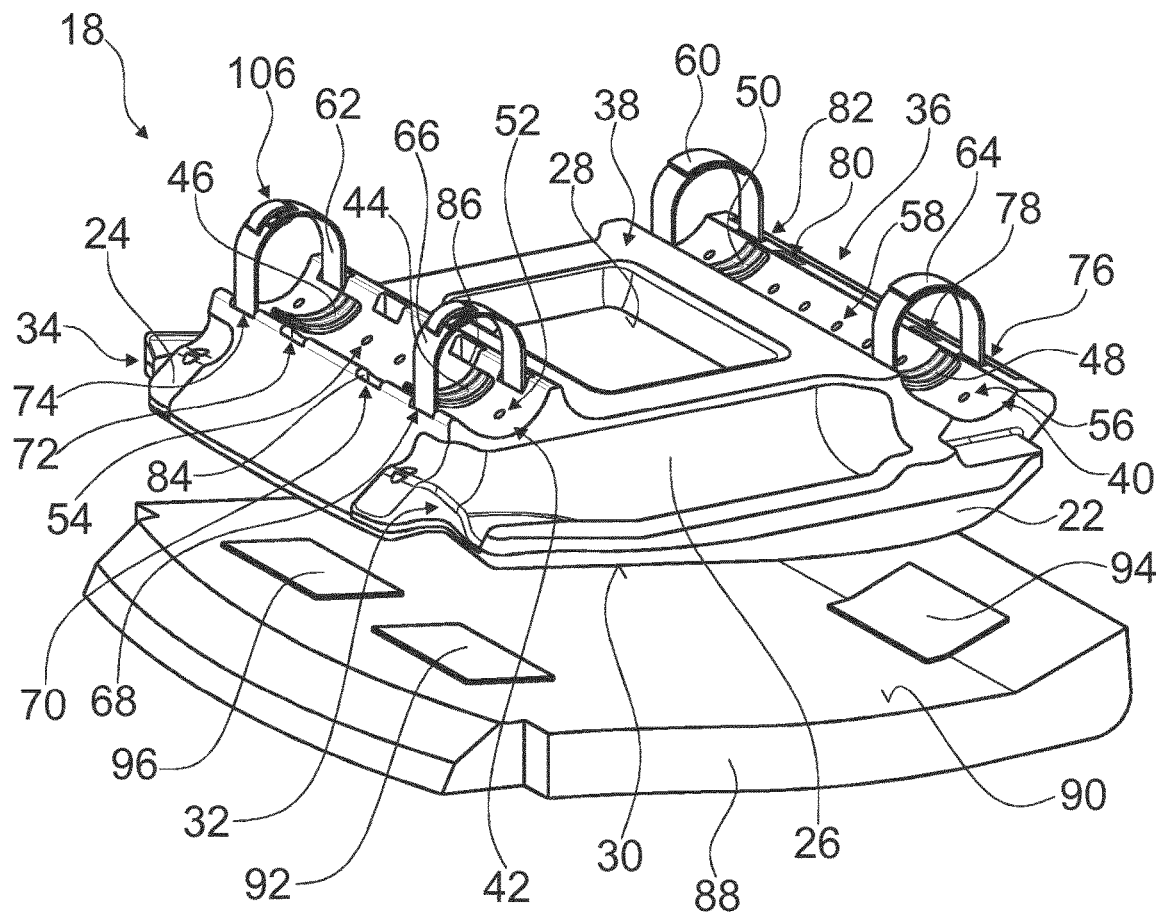
FIG. 3 shows a schematic view of an underside of the seat base module.
Figure 4:
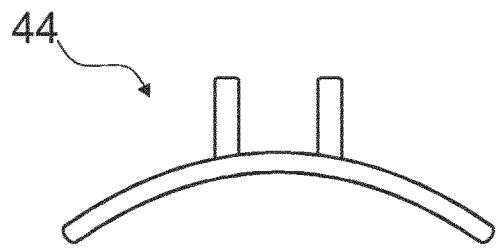
FIG. 4 shows a schematic view of a spacer according to the invention.

FIGS. 1 to 4 show an airplane seat device according to the invention. The seat device is part of an airplane seat 10 illustrated only in parts. It is conceivable herein that the airplane seat 10 is part of a seat row (not illustrated in more detail). The airplane seat 10 in a mounted state is erected in an airplane cabin (not illustrated in more detail) of an airplane. In order for said airplane seat 10 to be erected, the airplane cabin preferably has two fastening rails running in parallel, via which the airplane seat 10 is fixedly connectable to the cabin floor. The airplane seat 10 comprises a mounting unit 12, via which the airplane seat 10 is erected on the cabin floor. The mounting unit 12 comprises at least two front seat feet (not illustrated in more detail) and two rear seat feet (not illustrated in more detail), via which the airplane seat 10 is erected on the cabin floor. The mounting unit 12 of the airplane seat 10 comprises a front tubular support 14 and a rear tubular support 16. The tubular supports 14, 16 form a supporting structure of the airplane seat 10. The tubular supports 14, 16 run in a transverse direction of the airplane seat 10 which is aligned so as to be orthogonal to a seating direction of the airplane seat 10. If the airplane seat 10 is part of the seat row, the tubular supports 14, 16 are also part of a supporting structure of the further airplane seats of the seat row. The tubular supports 14, 16 have an annular cross section. The tubular supports 14, 16 herein are implemented so as to be thin-walled. In principle, it would also be conceivable that the airplane seat 10 has only a single tubular support.

The airplane seat device has a seat base module 18. The seat base module 18 is configured to implement a seat region 20 of the airplane seat 10 on which a passenger can sit, in particular during a flight. The seat base module 18 is connected to the mounting unit 12 of the airplane seat 10 by way of the two tubular supports 14, 16. The seat base module 18 has a main body 22. The main body 22 forms a supporting structure of the seat base module 18. The main body 22 is formed from a rigid foam. The main body 22 is formed in particular from a polypropylene foam (EPP). The main body 22 herein is formed completely from a polypropylene foam. In principle, it would also be conceivable that the main body 22 is formed from another rigid foam that appears expedient to a person skilled in the art, or that the main body 22 is formed from a combination of different rigid and/or soft foams. In principle, it is also conceivable that the main body 22 is formed from a plurality of regions of the same polypropylene foam, wherein the different regions each have dissimilar densities. The main body 22 has a substantially rectangular basic shape, wherein the main body 22 both on the underside 28 thereof as well as on the upper side 30 thereof, and on the lateral edges, has a contour via which the main body 22 differs from a pure rectangular basic shape. The main body 22 has two lateral regions 32, 34 in which the main body 22 is implemented so as to be thinner. In the lateral regions 32, 34 which each extend from a lateral edge of the main body 22 inward to approximately a quarter of an overall width of the main body 22, the main body 22 on the underside 28 thereof has in each case one recess. The main body 22 between the two lateral regions 32, 34 has a central region 36. The main body 22 in the central region 36 is implemented so as to be thicker than in the lateral regions 32, 34. The main body 22 in the central region 36 has recesses 38 which are incorporated into the main body 22 in order for the weight to be reduced.

The seat base module 18 has two reinforcement elements 24, 26. The reinforcement elements 24, 26 are disposed on an underside 28 of the main body 22. In principle, it is also conceivable that the reinforcement elements 24, 26 are disposed on an upper side of the main body 22, or are selectively also incorporated into the main body 22. The reinforcement elements 24, 26 are formed by a thin plastics layer. The reinforcement elements 24, 26 are embodied as plastics elements. The reinforcement elements 24, 26 are disposed in the lateral regions 32, 34 of the main body 22. The reinforcement elements 24, 26 in the lateral regions 32, 34 in each case extend from a front end of the main body 22 rearward in the direction of the rear end of the main body 22. The reinforcement elements 24, 26 leave a region free at the rear end of the main body 22. The reinforcement elements 24, 26 on a side that faces the main body 22 have a contour which corresponds to a contour of the main body 22. On account thereof, the reinforcement elements 24, 26 in the mounted state bear on the underside 28 of the main body 22. The reinforcement elements 24, 26 are connected in a form-fitting and materially integral manner to the main body 22. To this end, the finished reinforcement elements 24, 26 in a production process of the main body 22 are conjointly placed into a production device, and the main body 22 is foamed onto the reinforcement elements 24, 26 in a manner known to a person skilled in the art. The material of the main body 22 in the foaming procedure of the main body 22 connects in a materially integral and form-fitting manner to the reinforcement elements 24, 26. In principle, it would also be conceivable that the reinforcement elements 24, 26 after a production process of the main body 22 are adhesively bonded or welded to the latter. In principle, any other type of connection such as, for example, a connection by way of form-fitting and/or force-fitting elements that appear expedient to a person skilled in the art, is also conceivable.

In order to be attached to the tubular supports 14, 16, the seat base module 18 has a first, front accommodating region 40 and a second, rear accommodating region 42. The front accommodating region 40 herein is configured for receiving the front tubular support 14. The rear accommodating region 42 is configured for receiving the rear tubular support 16. The accommodating regions 40, 42 are implemented by the main body 22. The first, front accommodating region 40 herein is disposed on a front side of the main body 22. The second, rear accommodating region 42 is disposed on a rear side of the main body 22. The accommodating regions 40, 42 are disposed on the underside 28 of the main body 22. The accommodating regions 40, 42 are embodied as elongate recesses. The accommodating regions 40, 42 are implemented in a shell-shaped manner. The accommodating regions 40, 42 extend in the transverse direction. The accommodating regions 40, 42 embodied as elongate recesses have a shape which is implemented so as to correspond to a shape of the tubular supports 14, 16. The accommodating regions 40, 42 are disposed so as to be spaced apart from the reinforcement elements 24, 26. The accommodating regions 40, 42 are disposed in other regions of the main body 22 than the reinforcement elements 24, 26. The first, front accommodating region 40 in the transverse direction extends across the entire central region 36. The second, rear accommodating region 42 in the transverse direction extends across the entire central region 36 and protrudes into both lateral regions 32, 34.

The seat base module 18 per accommodating region 40, 42 has in each case two spacers 44, 46, 48, 50. In principle, it would also be conceivable that the seat base module 18 per accommodating region 40, 42 has another number of spacers 44, 46, 48, 50. Two spacers 44, 46 are disposed in the front accommodating region 40. Two spacers 48, 50 are disposed in the rear accommodating region 42. The spacers 44, 46, 48, 50 in the mounted state are disposed in the respective accommodating region 40, 42 and configured for mutually spacing apart the main body 22 and the respective tubular support 14, 16. The spacers 44, 46, 48, 50 in the mounted state are disposed in the respective accommodating region 40, 42 between the main body 22 and the respective tubular support 14, 16. The tubular supports 14, 16 do not have any direct point of contact with the respective accommodating region 40, 42 in which said tubular supports 14, 16 are disposed. The tubular supports 14, 16 are connected to the main body 22 by way of the spacers 44, 46, 48, 50. The spacers 44, 46, 48, 50 by way of an external side bear in the accommodating regions 40, 42. The spacers 44, 46, 48, 50 on the internal sides thereof configure bearing faces for the respective tubular support 14, 16. The spacers 44, 46, 48, 50 on the internal sides thereof herein have a coating (not illustrated in more detail in the drawings) that increases the coefficient of friction. In principle, it is also conceivable that the spacers 44, 46, 48, 50 on the internal sides thereof have in each case a rubber coating or a rib pattern which increases the coefficient of friction of the internal sides. A friction force between the spacers 44, 46, 48, 50 and the respective tubular support 14, 16 can advantageously be increased on account thereof. Slipping of the seat base module 18 on the tubular supports 14, 16 can be advantageously impeded on account thereof. A space in which in particular attachment elements are disposed, via which the seat feet are connected to the tubular supports 14, 16, is in each case established by the spacers 44, 46, 48, 50 between the main body 22 and the tubular supports 14, 16. Recesses specially incorporated into the main body 22 can be dispensed with by using the spacers 44, 46, 48, 50, so as to make space for the attachment elements.

The seat base module 18 in the accommodating regions 40, 42 has in each case a plurality of form-fitting and force-fitting elements 52, 54, 56, 58 for attaching the spacers 44, 46, 48, 50. For the sake of clarity, reference signs are provided for only four of the form-fitting and force-fitting elements 52, 54, 56, 58 in the drawings. The respective other form-fitting and force-fitting elements (not identified in more detail) are implemented so as to be identical to the form-fitting and force-fitting elements 52, 54, 56, 58 identified. The seat base module 18 in the rear accommodating region 42 has seven form-fitting and force-fitting elements 52, 54. The seat base module 18 in the front accommodating region 40 has nine form-fitting and force-fitting elements 56, 58. In principle, it is of course also conceivable that the seat base module 18 in the two accommodating regions 40, 42 has in each case another number of form-fitting and force-fitting elements 52, 54, 56, 58. The form-fitting and force-fitting elements 52, 54, 56, 58 in the accommodating regions 40, 42 are disposed so as to be mutually spaced apart in the transverse direction. The form-fitting and force-fitting elements 52, 54, 56, 58 herein have in each case a uniform mutual spacing. In principle, it is also conceivable that the form-fitting and force-fitting elements 52, 54, 56, 58 in the accommodating regions 40, 42 are spaced apart in a non-uniform manner. In each case one spacer 44, 46, 48, 50 is captively couplable to the main body 22 by way of in each case one form-fitting and force-fitting element 52, 54, 56, 58. The spacers 44, 46, 48, 50 are captively fastenable in the respective accommodating region 40, 42 by way of the form-fitting and force-fitting elements 52, 54, 56, 58. The form-fitting and force-fitting elements 52, 54, 56, 58 are in each case implemented by two recesses that in the respective accommodating region 40, 42 are incorporated into the main body 22. The recesses implementing the form-fitting and force-fitting elements 52, 54, 56, 58 herein have a round cross section. In principle, it is also conceivable that the recesses implementing the form-fitting and force-fitting elements 52, 54, 56, 58 have another cross section, for example an oval, rectangular, triangular, or a cruciform cross section. The spacers 44, 46, 48, 50 have in each case form-fitting and force-fitting elements (not illustrated in more detail) which are implemented so as to correspond to the form-fitting and force-fitting elements 52, 54, 56, 58 of the seat base module 18. The form-fitting and force-fitting elements of the spacers 44, 46, 48, 50 are implemented as pins. In the mounted state, the form-fitting and force-fitting elements of the spacers 44, 46, 48, 50 which are implemented as pins are disposed in the form-fitting and force-fitting elements 52, 54, 56, 58 of the seat base module 18 which are implemented as recesses. The form-fitting and force-fitting elements 52, 54, 56, 58 of the seat base module 18 which are implemented as recesses, in a state prior to the spacers 44, 46, 48, 50 being connected thereto, are implemented so as to be smaller than the form-fitting and force-fitting elements of the spacers 44, 46, 48, 50 which are embodied as pins. When the spacers 44, 46, 48, 50 by way of the form-fitting and force-fitting elements thereof are connected to the respective form-fitting and force-fitting elements 52, 54, 56, 58 of the seat base module 18, the form-fitting and force-fitting elements of the spacers 44, 46, 48, 50 which are embodied as pins deform the respective form-fitting and force-fitting elements 52, 54, 56, 58 of the seat base module 18 and, on account thereof, establish a form-fit and/or force-fit between the spacers 44, 46, 48, 50 and the main body 22. On account thereof, the spacers 44, 46, 48, 50 are captively disposed in the accommodating regions 40, 42. The spacers 44, 46, 48, 50, depending on the design embodiment of the airplane seat 10, can be disposed at various positions in the accommodating regions 40, 42 by way of the different form-fitting and force-fitting elements 52, 54, 56, 58 of the seat base module 18 which are disposed so as to be mutually spaced apart. On account thereof, the seat base module 18 is settable in a simple manner for different airplane seat types without anything having to be modified in terms of the construction on the main body 22.

The airplane seat device has four fastening elements 60, 62, 64, 66, via which the main body 22 is fixedly connectable to the tubular supports 14, 16. The main body 22 herein is connectable in each case by way of two fastening elements 60, 62, 64, 66 to a tubular support 14, 16. In principle, it is also conceivable that the airplane seat device has another number of fastening elements 60, 62, 64, 66 for attaching to the tubular supports 14, 16. The fastening elements 60, 62, 64, 66 for attaching the main body 22 to the tubular supports 14, 16 are in each case embodied as a tape. The fastening elements 62, 66 are in each case embodied as a hook-and-pile tape. The fastening elements 62, 66 which are embodied as hook-and-pile tapes on external sides have in each case one pile region, and on the internal sides thereof, one hook region. In order for a fastening element 62, 66 that is embodied as a hook-and-pile tape to be closed, the pile region and the hook region which in a wrapping at least partially face one another are compressed and, on account thereof, coupled to one another. The fastening elements 62, 66 which are embodied as hook-and-pile tapes are closable on account thereof. In order for the fastening elements 62, 66 which are embodied as hook-and-pile tapes to be opened, the pile region and the hook region are pulled apart by applying a disassembly force, on account of which a form-fitting connection between the pile region and the hook region is released, and the fastening element 62, 66 is opened. The fastening elements 60, 64 which are likewise embodied as tapes, have a hook element 106 at a first end for closing. The fastening elements 60, 64 at a second end have at least one eyelet which can be coupled to the hook element 106. In order to be coupled, the hook element 106 herein is guided through the eyelet. It is conceivable herein that the fastening elements have a plurality of mutually spaced apart eyelets, such that the fastening elements 60, 64 can be closed at various sizes. In order for the fastening elements 60, 62, 64, 66 to be connected to the main body 22, the main body 22 per accommodating region 40, 42 has four coupling regions 68, 70, 72, 74, 76, 78, 80, 82. The coupling regions 68, 70, 72, 74 are assigned to the rear accommodating region 2. The coupling regions 76, 78, 80, 82 are assigned to the front accommodating region 40. In principle, it is also conceivable that the fastening elements 60, 62, 64, 66 are implemented in another manner and can be closed by means of other means that appear expedient to a person skilled in the art.

Each of the coupling regions 68, 70, 72, 74, 76, 78, 80, 82 has two through bores 84, 86 which are disposed so as to be mutually spaced apart and which are incorporated into the main body 22, and in each case reach from the underside 28 of the main body 22 up to the upper side 30 of the main body 22. For reasons of clarity, only the through bores 84, 86 of the coupling region 70 are identified herein in the drawings. The fastening elements 60, 62, 64, 66 that in each case are embodied as a tape are guided through the through bores 84, 86 of the coupling regions 68, 70, 72, 74, 76, 78, 80, 82, so as to establish a form-fitting connection to the main body 22. The through bores 84, 86 of one of the coupling regions 68, 70, 72, 74, 76, 78, 80, 82 herein are in each case disposed so as to be mutually opposite on one side of a accommodating region 40, 42. On account of the multiplicity of coupling regions 68, 70, 72, 74, 76, 78, 80, 82, the fastening elements 60, 62, 64, 66 which are embodied as a tape can in each case be coupled to the main body 22 at one location, such that said fastening elements 60, 62, 64, 66 can be guided around the respective tubular support 14, 16. Since the seat feet in dissimilar airplane seat configurations can be disposed at other positions, an attachment of the main body 22 to the tubular supports 14, 16 can be simply varied in that the fastening elements 60, 62, 64, 66 are coupled to the main body 22 by way of the respective coupling region 68, 70, 72, 74, 76, 78, 80, 82.

The seat base module 18 has a comfort element 88. The comfort element 88 is formed by a cushion element from a soft foam and from a cover (not illustrated in more detail). The comfort element 88 is illustrated in a merely schematic manner in the drawings. The comfort element 88 by way of an upper side which in a mounted state faces away from the main body 22 configures the seat region 20. The comfort element 88 on an underside 90 which in a mounted state faces the main body 22 has four attachment regions 92, 94, 96, 98. The attachment regions 92, 94, 96, 98 are embodied as a hook tape. The fastening elements 60, 62, 64, 66 by means of which the main body 22 is coupled to the tubular supports 14, 16 have in each case one attachment region 100, 102, 104. The attachment regions 100, 102, 104 of the fastening elements 60, 62, 64, 66 are embodied as pile tapes.

The attachment regions 102 of the fastening elements 60, 64 which are embodied as pile tapes herein are implemented so as to be integral to the pile regions which the fastening elements 60, 64 have for closing. The attachment regions 100, 102, 104 of the fastening elements 60, 62, 64, 66 are implemented so as to correspond to the attachment regions 92, 94, 96, 98 of the comfort element 88. In principle, it would also be conceivable that the attachment regions 100, 102, 104 of the fastening elements 60, 62, 64, 66 are embodied as hook tapes, and the attachment regions 92, 94, 96, 98 of the comfort element 88 are embodied as pile tapes. In principle, it would also be conceivable that the attachment regions 100, 102, 104 of the fastening elements 60, 62, 64, 66 and the attachment regions 92, 94, 96, 98 of the comfort element 88 are implemented as other force-fitting and/or form-fitting elements that are implemented correspondingly to one another, such as press studs, for example, that appear expedient to a person skilled in the art. The comfort element 88 is captively connectable to the main body 22 by way of the attachment regions 100, 102, 104 of the fastening elements 60, 62, 64, 66 and the attachment regions 92, 94, 96, 98 of the comfort element 88. The comfort element 88 herein can be separated from the main body 22 in a non-destructive manner. In principle, it is likewise conceivable that the comfort element 88 on the underside 90 thereof has further attachment regions, wherein the main body 22 herein on the upper side 30 thereof would have respectively correspondingly implemented attachment regions.

LIST OF REFERENCE SIGNS

10 Airplane seat
12 Mounting unit
14 Tubular support
16 Tubular support
18 Seat base module
20 Seat region
22 Main body
24 Reinforcement element
26 Reinforcement element
28 Underside
30 Upper side
32 Lateral region
34 Lateral region
36 Central region
38 Recess
40 Accommodating region
42 Accommodating region
44 Spacer
46 Spacer
48 Spacer
50 Spacer
52 Form-fitting and force-fitting element
54 Form-fitting and force-fitting element
56 Form-fitting and force-fitting element
58 Form-fitting and force-fitting element
60 Fastening element
62 Fastening element
64 Fastening element
66 Fastening element
68 Coupling region
70 Coupling region
72 Coupling region
74 Coupling region
76 Coupling region
78 Coupling region
80 Coupling region
82 Coupling region
84 Through bore
86 Through bore
88 Comfort element
90 Underside
92 Attachment region
94 Attachment region
96 Attachment region
98 Attachment region
100 Attachment region
102 Attachment region
104 Attachment region
106 Hook element

The invention claimed is:

1. An airplane seat device with a seat base module, comprising
at least one main body, which is at least substantially implemented from a rigid foam;
at least one comfort element, which is disposed on an upper side of the main body;
at least one accommodating region which is adapted to be attached to a tubular support;
at least one fastening element, which is adapted to attach the main body directly to the tubular support, wherein the main body has at least two coupling regions, via which the at least one fastening element can be selectively attached to the main body,
the main body includes through-bores, which extend from a lower surface to an upper surface of the main body,
the fastening element extends through the through-bores, and
the fastening element is adapted to encircle the tubular support and a portion of the main body.

2. The airplane seat device as claimed in claim 1, wherein the coupling regions are disposed in the accommodating regions.

3. The airplane seat device as claimed in claim 1, wherein the seat base module has at least one spacer which in a mounted state is disposed in the at least one accommodating region and is configured for spacing apart the main body and the tubular support.

4. The airplane seat device as claimed in claim 3, wherein the seat base module in the at least one accommodating region has at least one form-fitting and/or force-fitting element, via which the spacer is captively fastenable in the accommodating region.

5. The airplane seat device as claimed in claim 4, wherein the seat base module in the at least one accommodating region has further form-fitting and/or force-fitting elements which are disposed to be mutually spaced apart and by which the at least one spacer is captively fastenable in the accommodating region.

6. The airplane seat device as claimed in claim 1, wherein the at least one fastening element is embodied as a tape via which the main body is connectable to the tubular support.

7. The airplane seat device as claimed in claim 1, wherein the at least one fastening element is embodied as a hook-and-pile tape.

8. The airplane seat device as claimed in claim 1, wherein the at least one fastening element has at least one attachment region, via which the comfort element is fixedly connectable to the fastening element.

9. The airplane seat device as claimed in claim 8, wherein the attachment region of the at least one fastening element is embodied as a pile or hook region.

10. The airplane seat device as claimed in claim 1, wherein the seat base module has at least one reinforcement element that is disposed on an underside of the main body.

11. The airplane seat device as claimed in claim 10, wherein the at least one accommodating region is implemented by the main body for an attachment to one of the tubular supports and is disposed to be spaced apart from the at least one reinforcement element.

12. The airplane seat device as claimed in claim 10, wherein the reinforcement element is implemented by a substantially thin plastics layer.

13. An airplane seat having an airplane seat device as claimed in claim 1.

14. A seat base module for an airplane seat device as claimed in claim 1.

15. An airplane seat device with a seat base module, comprising
    at least one main body, which is at least substantially implemented from a rigid foam;
    at least one comfort element, which is disposed on an upper side of the main body;
    at least one accommodating region, which is adapted to attach to a tubular support; and
    at least one fastening element, which is adapted to attach to the tubular support, wherein
    the main body has at least two coupling regions, via which the at least one fastening element can be selectively attached to the main body,
    the seat base module has at least one spacer, which in a mounted state is disposed in the at least one accommodating region and is configured for spacing apart the main body and the tubular support, and
    the seat base module in the at least one accommodating region has at least one form-fitting and/or force-fitting element, via which the spacer is captively fastenable in the accommodating region.

16. An airplane seat device with a seat base module, comprising
    at least one main body, which is at least substantially implemented from a rigid foam;
    at least one comfort element, which is disposed on an upper side of the main body;
    at least one accommodating region, which is adapted to attach to a tubular support; and
    at least one fastening element, which is adapted to attach to the tubular support, wherein
    the main body has at least two coupling regions, via which the at least one fastening element can be selectively attached to the main body,
    the seat base module has at least one reinforcement element that is disposed on an underside of the main body, and
    the at least one accommodating region is implemented by the main body for an attachment to one of the tubular supports and is disposed to be spaced apart from the at least one reinforcement element.

\* \* \* \* \*